United States Patent [19]

Parker

[11] Patent Number: 5,042,900
[45] Date of Patent: Aug. 27, 1991

[54] CONNECTOR ASSEMBLIES FOR OPTICAL FIBER LIGHT CABLES

[75] Inventor: Jeffery R. Parker, Concord, Ohio

[73] Assignee: Lumitex, Inc., Cleveland, Ohio

[21] Appl. No.: 399,573

[22] Filed: Aug. 28, 1989

Related U.S. Application Data

[63] Continuation-in-part of Ser. No. 242,898, Sep. 12, 1988, Pat. No. 4,907,132, which is a continuation-in-part of Ser. No. 171,844, Mar. 22, 1988, Pat. No. 4,885,663.

[51] Int. Cl.$^5$ ............................ G02B 6/36; G02B 7/26
[52] U.S. Cl. ..................................................... 385/76
[58] Field of Search ................. 350/96.2, 96.22, 96.25, 350/96.24

[56] References Cited

U.S. PATENT DOCUMENTS 4,822,131 4/1989 Anderton ........................... 350/96.2

FOREIGN PATENT DOCUMENTS 1535285 8/1967 France .
2429444 6/1979 France .
1356474 6/1974 United Kingdom .

Primary Examiner—William L. Sikes
Assistant Examiner—Robert E. Wise
Attorney, Agent, or Firm—Renner, Otto, Boisselle & Sklar

[57] ABSTRACT

A connector assembly includes buffer material surrounding the optical fibers at one end of an optical fiber light cable and a ferrule crimped onto the buffer material which squeezes the buffer material and packs the optical fiber ends substantially solid. During the crimping operation, the buffer material protects the optical fibers from the ferrule while permitting the optical fibers to be deformed to a desired cross-sectional shape, for example, to that of a polygon so they are packed more solid. Different types of shielding may be used to prevent light from a light source from striking selected areas of the polished end of the connector assembly including particularly the buffer material and, if desired, a surrounding ferrule to reduce heat build-up in the connector assembly so that more light energy can be transmitted through the light cable without overheating.

20 Claims, 4 Drawing Sheets

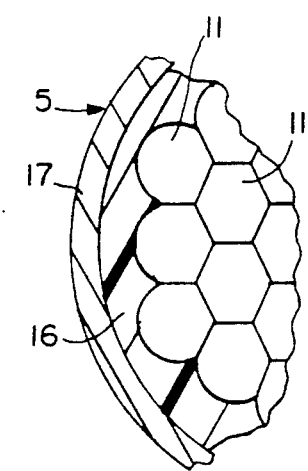
FIG. 13
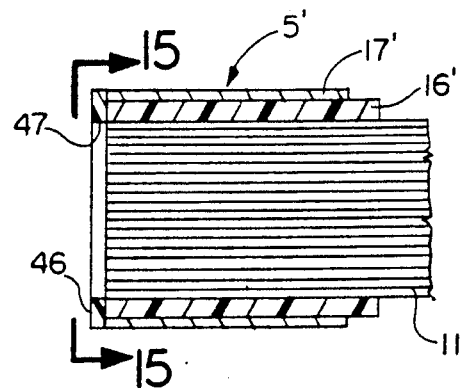
FIG. 14
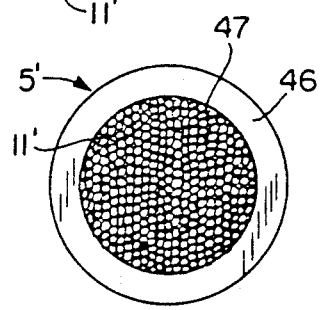
FIG. 15
FIG. 17
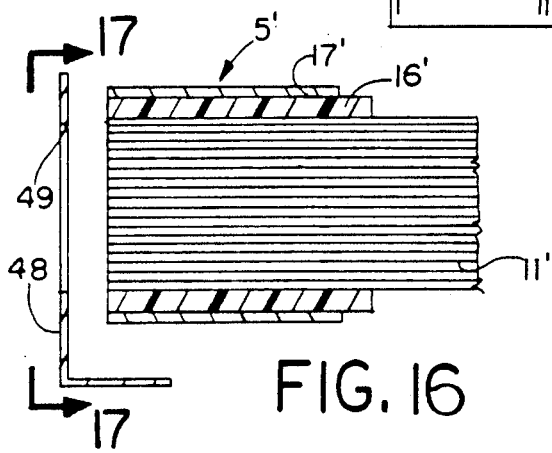
FIG. 16
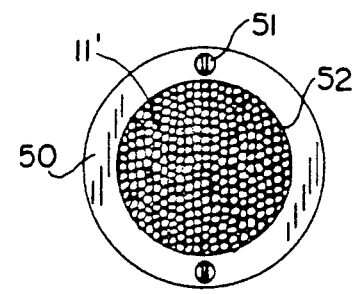
FIG. 19
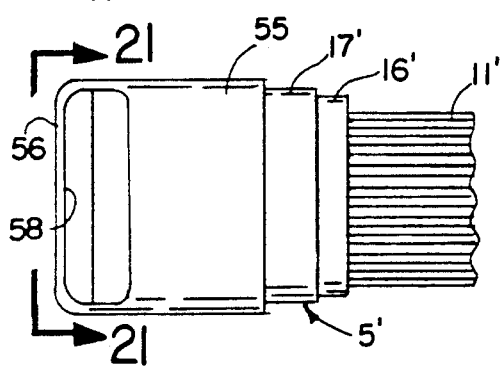
FIG. 20
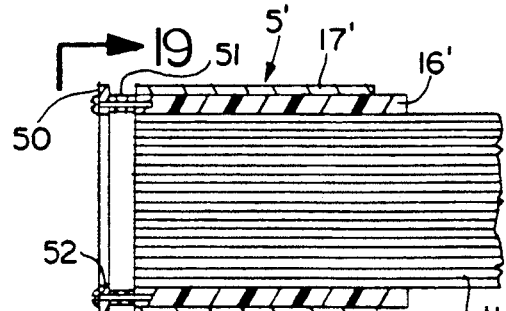
FIG. 18
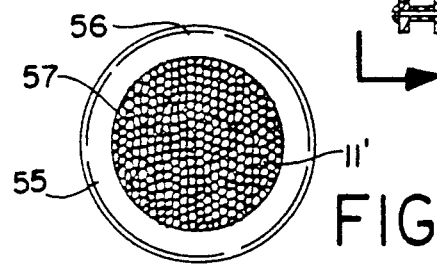
FIG. 21

CONNECTOR ASSEMBLIES FOR OPTICAL FIBER LIGHT CABLES

CROSS REFERENCE TO RELATED APPLICATIONS

This application is a continuation-in-part of applicant's copending U.S. patent application Ser. No. 242,898, entitled "Light Emitting Panel Assemblies And Method Of Making Same", filed Sept. 12, 1988, now U.S. Pat. No. 4,907,132, dated Mar. 6, 1990, which is a continuation-in-part of applicant's copending U.S. patent application Ser. No. 171,844, entitled "Fiber Optic Light Emitting Panel and Method of Making Same", filed Mar. 22, 1988, now U.S. Pat. No. 4,885,663, dated Dec. 5, 1989, both of which are incorporated herein by reference.

BACKGROUND OF THE INVENTION

This application relates to certain improvements in connector assemblies which serve as an interface between a light source and the ends of optical fiber light cables for transmitting light through the cables, for example, to light emitting panel assemblies including one or more panels made of woven optical fibers. Light is caused to be emitted from the panel by disrupting the surface of the optical fibers in the panel area as by scratching or otherwise deforming as by bending the optical fibers at a plurality of discrete locations along their length such that the angle of bend approximately exceeds the angle of internal reflection. The percentage of light emitted from each bend is proportional to the bend radius and arc length. By controlling the weave spacing and pattern of the woven optical fibers, one can control the shape and radius of the bends at any location on a woven panel to thereby control the desired light output pattern from the panel.

A fiber optic light emitting panel generally of this type is disclosed in applicant's aforementioned copending U.S. application Ser. No. 171,844 now U.S. Pat. No. 4,885,663. Also, as further disclosed in such copending application, the optical fibers can be coated with a material having a refractive index that will cause a change in the attenuation of the optical fibers in the light emitting portion of the panel to increase the optical efficiency of the panel. The amount of attenuation can be varied by varying the index of refraction and thickness of the applied coating.

In applications where the coating is applied to the entire length of the fibers in the light emitting portion of the panel, or such light emitting portion is completely encapsulated in such a coating, attenuation changes will occur over the entire light emitting portion. In other applications where increased optical efficiency is desired, it would be desirable to cause attenuation changes only at selected areas of the panel from which light is normally emitted.

SUMMARY OF THE INVENTION

According to the present invention, a connector assembly is provided at an end of an optical fiber light cable to serve as an interface between a light source and the light cable. The connector assembly includes a buffer material surrounding the end portions of the optical cable fibers and a ferrule that is crimped onto the buffer material to pack the end portions substantially solid.

Further in accordance with the invention, the connector assembly may be heated during crimping to cause the optical cable fibers to be deformed to a desired cross-sectional shape so that they are packed more solid.

Still further in accordance with the invention, the optical cable fibers may be made of plastic and the connector assembly heat treated before crimping to preshrink the optical cable fibers to provide a higher operating temperature limit.

Also according to the invention, the polished end of the connector assembly may be coated with a suitable coating that reflects certain wavelengths of light. Moreover, different types of shielding may be positioned relative to the polished end of the connector assembly to prevent light from striking selected areas of such polished end including particularly the buffer material and, if desired, a surrounding ferrule to reduce heat build-up in the connector assembly while still permitting light to be focused onto the optical cable fiber ends so that more light energy can be transmitted through the light cable without overheating.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 13 is an enlarged fragmentary transverse section through the connector assembly of FIG. 6 schematically showing the end portions of the optical fibers deformed to the shape of a polygon to permit such end portions to be packed more solid;

FIGS. 14, 16, 18 and 20 are enlarged schematic longitudinal sections through alternate forms of connector assemblies in accordance with this invention; and FIGS. 15, 17, 19 and 21 are end views of the respective connector assemblies shown in FIGS. 14, 16, 18 and 20.

DETAILED DESCRIPTION OF THE PREFERRED EMBODIMENTS

Figure 1:
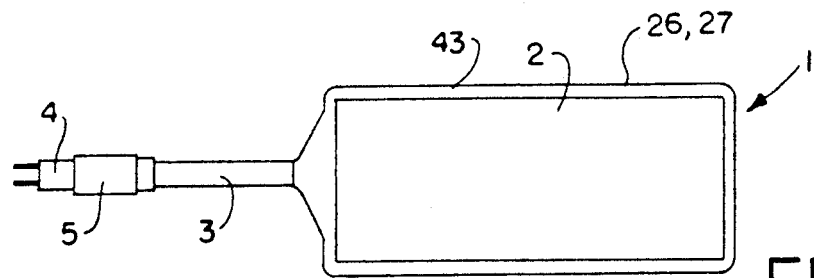
FIG. 1 is a schematic top plan view of one form of light emitting panel assembly including a light cable with connector assembly in accordance with this invention at one end to provide an interface between a remote light source and the optical cable fiber ends.
Figure 2:
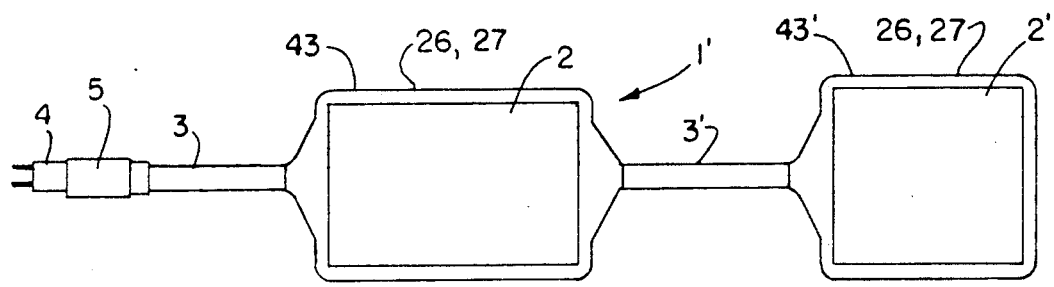
FIG. 2 is a schematic top plan view of another form of light emitting panel assembly including plural panels connected together and a light cable with connector assembly connected to one of the panels.

Referring now in detail to the drawings, and initially to FIGS. 1 and 2, there are schematically shown two different panel assemblies 1 and 1' in accordance with this invention each including one or more light emitting panels 2, 2' having light cables 3 at one or both ends to transmit light from a remote light source 4 to the light emitting panel. At the outermost end of the optical cable 3 is a connector assembly 5 which serves as an interface between the light source 4 and the optical fiber ends. The panel assembly 1 shown in FIG. 1 includes a single light emitting panel 2, with an optical cable 3 and connector assembly 5 at one end thereof, whereas the panel assembly 1' shown in FIG. 2 includes two light emitting panels 2, 2' interconnected together by means of an optical cable 3' and having another optical cable 3 connected to the panel 2 with a connector assembly 5 and light source 4 at the outermost end thereof.

Each light emitting panel 2 (or 2') may be made of one or more layers 10 of optical fibers 11 which may be woven into a sheet or mat in the manner disclosed, for example, in U.S. Pat. No. 4,234,907 granted to Maurice Daniel on Nov. 18, 1980, the disclosure of which is incorporated herein by reference. In the example shown in FIG. 3 of the present application, the light emitting panel 2 consists of one woven optical fiber layer 10, whereas in the example shown in FIG. 5, the panel consists of two such layers 10, 10'. Preferably, the optical fibers 11 of each layer are woven only in the warp direction, with fill threads 12 woven in the weft direction. However, it should be understood that the fill threads 12 could also be optical fibers if desired. The weft threads are the threads usually carried by the shuttle of a weaving loom, whereas the warp threads extend lengthwise of the loom, crossed by the weft threads.

Each optical fiber 11 may be made from one or more optical fiber strands each including a light transmitting core portion of a suitable transparent material and an outer sheath or cladding of a second transparent material having a relatively lower index of refraction than the core material to assist in preventing the escape of light along its length. The core material can be made of either glass or plastic or a multi-strand filament having the desired optical characteristics. The index of refraction of the outer sheath material is less than that of the core material, whereby substantially total reflection is obtained at the sheath-core interface, as well known in the art.

Figure 3:
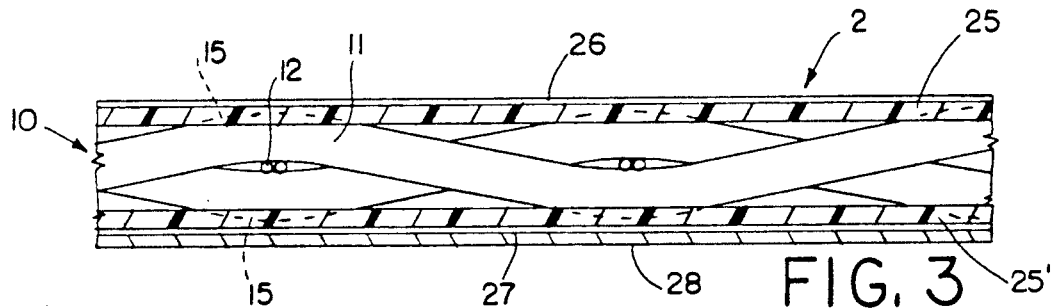
FIG. 3 is an enlarged schematic fragmentary longitudinal section through any one of the light emitting panels of FIGS. 1 and 2.
Figure 5:
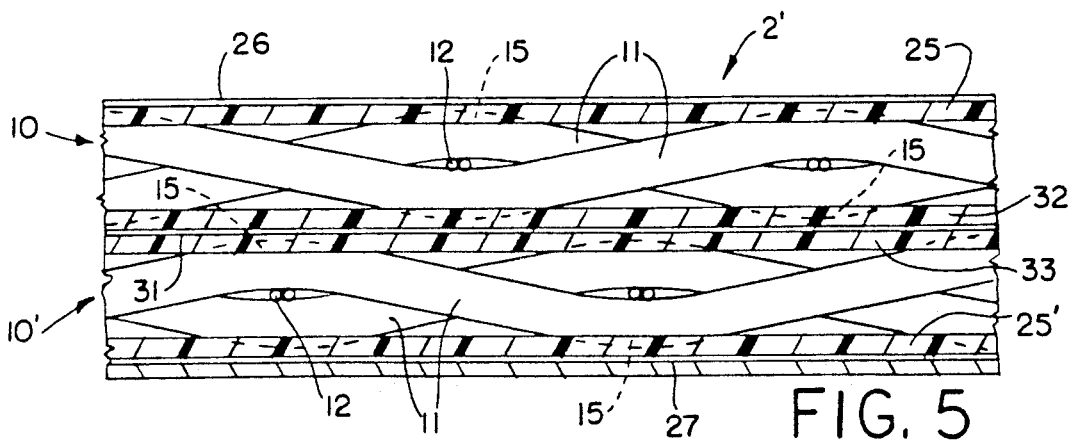
FIG. 5 is an enlarged schematic fragmentary longitudinal section through another form of light emitting panel.

To cause light to be emitted from each light emitting panel 2, the external surface of the optical fibers 11 may be disrupted as by bending the optical fibers 11 at a plurality of discrete locations along their lengths as schematically shown in FIGS. 3 and 5 such that the angle of each bend 15 approximately exceeds the angle of internal reflection so that a portion of the light will be emitted at each bend 15.

Figure 4:
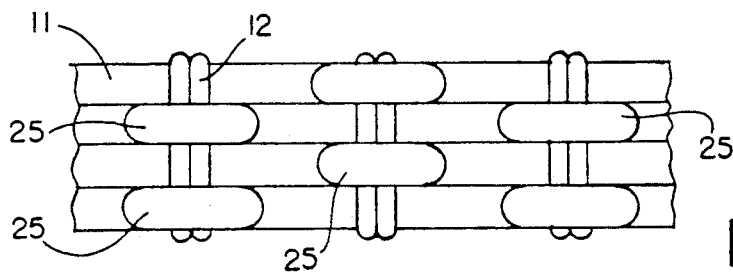
FIG. 4 is a schematic fragmentary top plan view showing attenuation producing coatings applied to selected light emitting areas of the panel of FIG. 3.

The uniformity of illumination of each light emitting panel 2 may be varied by varying the shape of the optical fiber disruptions or bends 15 and/or the spacing between such disruptions or bends as by varying the pattern and tightness of the weave or by varying the proportion of optical fibers 11 to other material in the weave. The illumination can, for example, be increased by placing the disruptions or bends 15 closer together or by making the weave progressively tighter as the distance from the light source 4 increases. Using fill threads 12 having different coefficients of friction will also help to control the tightness of the weave, in that the higher the coefficient of friction, the tighter it is possible to weave the optical fibers 11. Also, a plurality of fill threads 12 may be used as further schematically shown in FIGS. 3–5 to provide more surface points for increased friction, and to reduce the thickness of each individual fill thread and thus the thickness of the panel 2 while still achieving substantially the same rigidity provided by a thicker fill thread.

Figure 7:
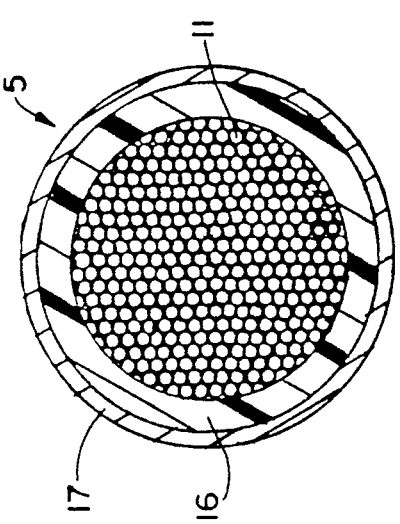
FIG. 7 is a transverse section through the connector assembly of FIG. 6 taken generally on the plane of the line 7—7 thereof.
Figure 6:
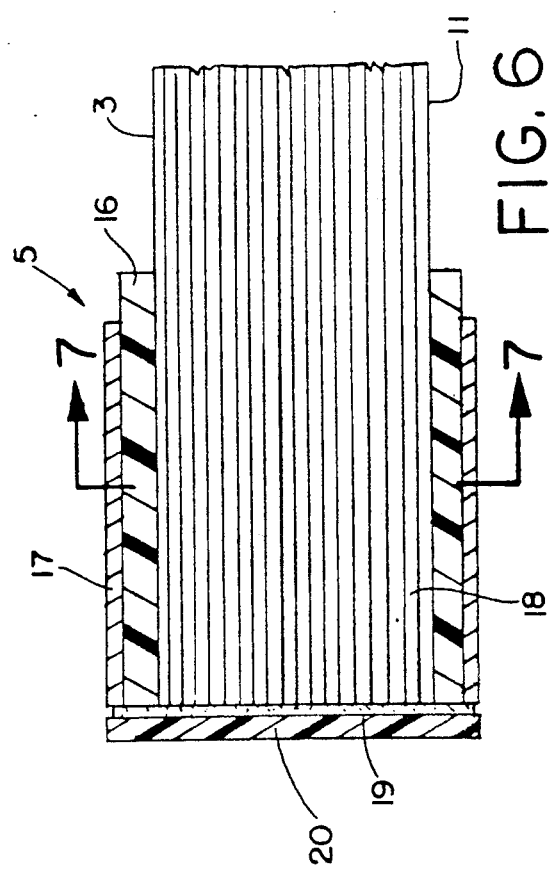
FIG. 6 is an enlarged schematic longitudinal section through the connector assembly of FIGS. 1 and 2.

The optical fibers 11 at one or both ends of each panel 2 may be brought together and bundled to form either a ribbon cable or a round cable 3 as desired to transmit light from the remote light source 4 to one or more light emitting panels 2. At the outermost end of the optical cable 3 is the connector assembly 5 which, as shown in greater detail in FIGS. 6 and 7, may consist of a buffer material 16 surrounding the gathered optical fibers 11 and a ferrule 17 crimped onto the buffer material which squeezes the buffer material and packs the optical fiber ends 18 substantially solid.

The buffer material 16 may be made of any suitable material such as Teflon that will protect the optical fibers 11 from the ferrule 17 during the crimping operation. Alternatively, the ferrule 17 itself may be made out of a suitable buffer material, thus eliminating the need for a separate buffer. The buffer material desirably has a low refractive index so that it does not cause high attenuation on the surface of the optical fibers 11 contacted thereby.

If desired, the connector assembly 5 may be heated during the crimping operation to soften the buffer material 16 or optical fibers 11 to permit them to be deformed to the desired cross-sectional shape, for example, to that of a polygon, so that the compacted ends of the optical fibers are packed more solid as schematically shown in FIG. 13. After crimping, the cable end 19 may be cut off and polished to the desired finish.

Both the ferrule 17 and buffer material 16 may have a lip or flange thereon to provide a locating point or surface thereon. Also, if the optical fibers 11 are made of plastic, the connector assembly 5 may be heat treated to preshrink the optical fibers 11 before polishing to produce a higher operating temperature limit.

After polishing, the polished end 19 of the connector assembly 5 may be coated with a suitable coating that reflects certain wavelengths of light. Also, a window or filter 20 may be adhesively bonded to the polished end 19 of the connector assembly 5.

FIGS. 14–21 show additional connector assemblies in accordance with this invention which are generally similar in construction to the connector assembly 5 previously described. Accordingly, the same reference numerals followed by prime symbols are used to designate like parts. However, the connector assemblies shown in FIGS. 14–21 differ from that shown in FIG. 5 in that different types of shielding are used to prevent light from striking selected areas of the polished ends of the connector assemblies including particularly the buffer material and, if desired, the ferrule to reduce heat build-up in the connector assemblies while still permitting light (from the light source 4) to be focused onto the optical fiber ends so that more light energy can be transmitted through the optical fibers without overheating.

In the embodiment shown in FIGS. 14 and 15, the shielding material comprises a reflective coating or disc 46 applied to the outer end of the buffer material 16', and, if desired, to the ferrule 17' as well to reflect light from the light source 4 away from these areas while still allowing light to be focused onto the polished ends of the optical fibers 11'. Where the shielding material 46 is a disc, the disc may be glued, fastened or otherwise attached directly to the buffer material 16' and, if desired, the ferrule 17' to cover same while a central opening 47 in the disc allows the light to be focused onto the ends of the optical fibers 11'. The disc 46 may be made, for example, of Mylar or other suitable plastic having an adhesive surface on its inner face for attachment to the buffer material and a silver or other mirror-like coating on its outer surface for reflecting light.

Alternatively, instead of positioning the shielding material in direct contact with the buffer material as shown in FIGS. 14 and 15, the shielding material may be positioned a slight distance away from the polished end of the connector assembly as schematically shown in FIGS. 16-21 to provide an air space therebetween to promote air flow for cooling purposes. Also, spacing the shielding material away from the polished end of the connector assembly has the further advantage of preventing the shielding material from acting as an insulator and/or transferring heat from the shielding material to the connector assembly.

In each instance, an annular opening through the shielding material allows light from the light source to strike the ends of the optical fibers, but not the buffer material and ferrule.

In the embodiment shown in FIGS. 16 and 17, the shielding material comprises a plate 48 supported independently of the connector assembly 5', positioned to allow light to pass through an annular opening 49 therein and strike the ends of the optical fibers 11' but not the buffer material 16' and ferrule 17'. Because there is not direct contact between the plate 48 and connector assembly 5', the plate 48 may be made of a material such as black anodized aluminum that absorbs the light that would otherwise strike the outer end of the buffer material and ferrule, or have a reflective surface that reflects such light.

In FIGS. 18 and 19, the shielding material is in the form of an annular plate 50 which is mechanically fastened to the buffer material 16' using stand-offs 51 to position the plate in front of the polished cable end. The plate 50 is desirably made of a material that reflects the light from the light source away from the outer end of the buffer material and ferrule, whereas a central opening 52 in the plate in alignment with the optical fiber ends permits the light from the light source to strike such optical fiber ends.

In FIGS. 20 and 21, the shielding material is in the form of a cap 55 that fits over the polished connector end. The cap includes a reflective outer end wall 56 that is desirably spaced a slight distance from the polished connector end, with slots 58 in the sides of the cap to allow air to pass between the cap end wall 56 and connector end for cooling purposes. The cap end wall 56 has a central opening 57 therein of a size which allows light from the light source to be focused onto the ends of the optical fibers 11' but not on the buffer material and ferrule. Light from the light source striking the cap end wall 56 will be reflected away from the outer end of the buffer material and ferrule.

The light source 4 may be of any suitable type including any of the types disclosed in applicant's copending U.S. application Ser. No. 125,323, filed Nov. 24, 1987, now U.S. Pat. No. 4,897,771, dated Jan. 30, 1990, which is also incorporated herein by reference. If desired, such light source 4 may be epoxied directly to the polished end 19 of the connector assembly 5 or to the window or filter 20 interposed therebetween.

A cross-sectional view of one form of light emitting panel 2 in accordance with this invention is schematically shown in FIG. 2 wherein a transparent coating 25 having a different refractive index than the core material of the optical fibers 11 is applied to selected light emitting areas of the panel to cause changes in the attenuation of light being emitted from the panel. Preferably, the coating 25 is only applied to the outer surfaces of the disruptions or bends 15 on one or both sides of each optical fiber layer 10. This increases the overall optical efficiency of the panel 2 by causing attenuation changes only where the light normally escapes from the disruptions or bends 15 of the woven optical fiber panel 2.

In the example shown in FIG. 2, suitable coatings 25, 25' are applied to the outer surfaces of the optical fiber disruptions or bends 15 on both sides of the panel 2. One method of applying such coatings to selected bend areas of the woven optical fibers 11 is to use the same or different carrier members 26, 27 to laminate the coatings to opposite sides of the optical fiber panel. The material of the carrier members 26, 27 may vary depending on the particular application. For example, carrier member 26 may be made of a clear plastic film having a suitable coating 25 on one side only for coating one side of the panel 2, whereas the other carrier member 27 may have a coating 25' on one side for coating the other side of the panel and a highly reflective film 28 on the other side. Such a reflective film carrier member 27 also acts as a back reflector to redirect the light that is emitted from the other side back through the panel and out through the one side. Also, the carrier member may be the coating itself. For example, a Teflon film may be used both as the carrier and coating.

The amount of attenuation at a particular disruption or bend 15 may be controlled by changing the amount of surface area of the bend 15 which is covered by the coating 25, 25'. This may be determined, for example, by the type of press rolls and amount of pressure used to apply the carrier members 26, 27 to the optical fiber layer 10 during the laminating process. For example, a higher pressure applied to the carrier members 26, 27 by press rolls 29, 30 (see FIG. 8) having a softer rubber sleeve will produce a greater coated area. Also, by varying the pressure of the press rolls 29, 30 as the laminating proceeds along the length of each panel, one can gradually increase or decrease the coated area on the optical fiber bends 15 to adjust the uniformity of light output from such bends.

The areas of the optical fibers 11 not in direct contact with the coatings 25, 25' are encapsulated by air. By changing the index of refraction of the coatings 25, 25' relative to the index of refraction of air, one can change the ratio of attenuation between a coated and non-coated area of the optical fiber panel 2. Such coatings 25, 25' may be a solid, liquid or gas.

If it is desired to emit light substantially only from one side of the panel 2, a higher index of refraction coating 25 may be applied to the outer surface of the bends 15 on one side of the panel 2, and a lower index of refraction coating 25' applied to the outer surface of the bends 15 on the other side of the panel. The lower index coating substantially reduces the amount of light emitted from the other side of the panel, which in turn substantially reduces the percentage of light that has to be reflected back through the panel. The net result is that the overall optical efficiency of the panel is increased because absorption and scattering losses due to back reflection of light are lowered.

When the optical fiber panel 2' contains multiple optical fiber layers 10, 10' as shown in FIG. 5, a carrier member 31 having the same or different index of refraction coatings 32, 33 on opposite sides thereof may also be laminated between the optical fiber layers 10, 10' so that the respective coatings 32, 33 will contact the outer surfaces of the bends 15 on the inwardly facing sides of the optical fiber layers.

Figure 9:
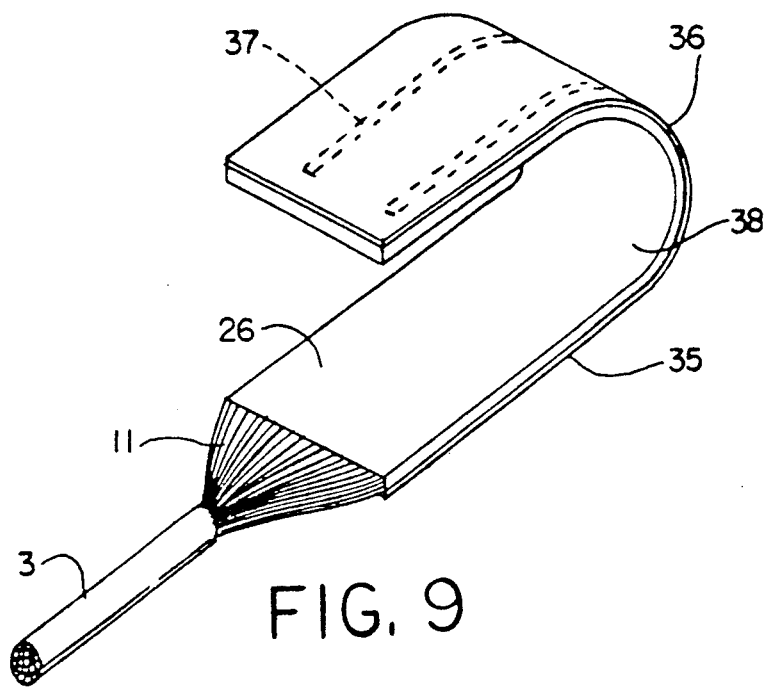
FIGS. 9, 11 and 12 are schematic illustrations showing different shapes of panels.

If desired, carriers 26, 27, 31 may be a resin or epoxy-coated film which may be heat or radiation cured upon assembly. Also, one of the carriers 35 may be a metal back reflector 36, or metal inserts 37 may be inserted into the panel 38 so that the panel can be bent or formed to a particular shape as schematically shown in FIG. 9.

These various carriers 26, 27, 31 may also be used as a support to hold the weave spacing and pattern in position. Furthermore, such carriers may be used as a top coat for the woven optical fiber panel 2 to provide protection for the panel from hazardous environments. This would make the panel assembly 1 particularly suitable for use in certain medical or dental applications where it is necessary to clean or sterilize the assembly after each use.

Carrier 26 (shown in FIGS. 3 and 5) may also be a prismatic or lenticular film to redirect exit light ray angles for a particular application. Alternatively, carrier 26 may be a glass or plastic filter that absorbs or reflects certain frequencies of light. Likewise, carrier 26 may be a diffuser or transreflector which diffuses light emitted from the woven optical fiber panel 2 and reflects ambient light. This type of assembly 1 could be used to back light a liquid crystal display, where ambient light is used for viewing when available and the optical fiber panel 2 is used as a back light during low ambient levels.

Figure 8:
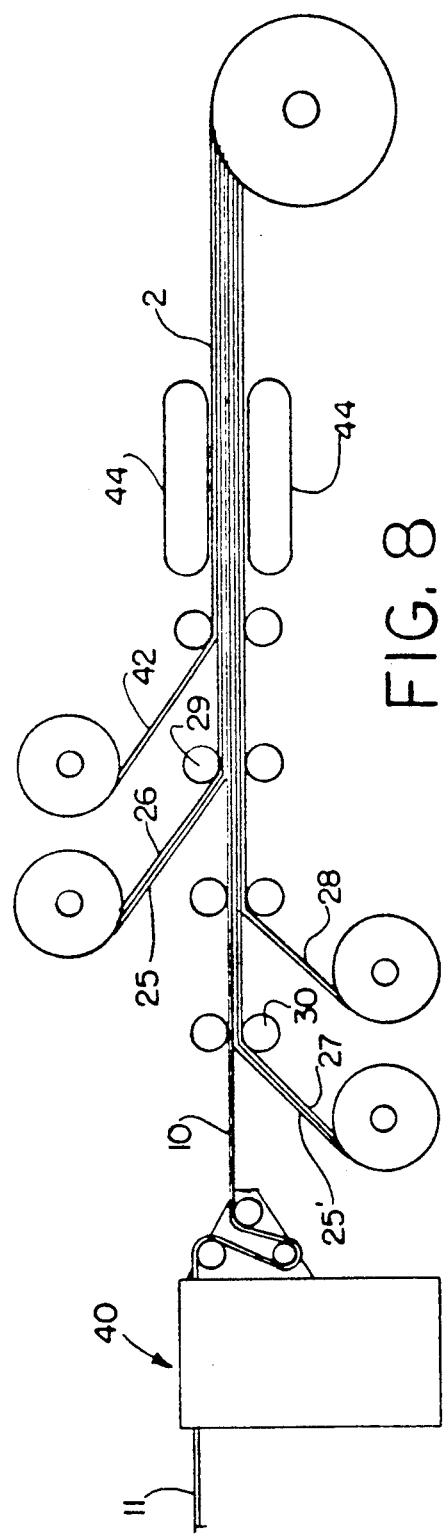
FIG. 8 is a schematic illustration of one form of laminating system for use in making any of the panels of FIGS. 1-5.

FIG. 8 schematically shows a laminating system for making light emitting panels of the type disclosed herein using a loom 40 for weaving one or more layers 10 of optical fiber material 11. As the optical fiber layer 10 comes off the loom 40, one or both surfaces of the optical fiber layer 10 may be coated with a coating 25, 25' having the same or different refractive indexes using suitable carriers 26, 27. Also, a suitable back reflector 28 may be applied to the exterior of carrier 27, and a clear film or diffuser 42 may be applied to the exterior of carrier 26. Suitable heaters 44 may be used to apply heat to opposite sides of the panel material, and the carriers 26, 27 may be sealed around the periphery 43, 43' of each panel 2, 2' to provide a protective barrier for each panel 2, 2' as schematically shown in FIGS. 1 and 2.

Figure 10:
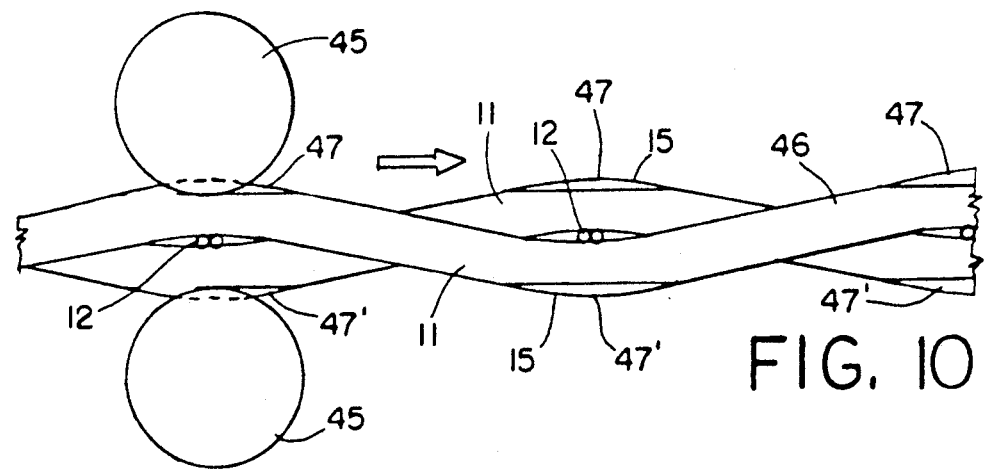
FIG. 10 is a schematic illustration of another form of laminating system for use in making a modified form of panel.

In lieu of using permanent carriers 26, 27 for applying the coating material 25, 25', a non-permanent carrier such as a roller 45, 45' may be used to coat the outer surface of the bends 15 of a woven optical fiber panel 46 with a suitable coating 47, 47' after the weaving process, as schematically shown in FIG. 10. A non-permanent carrier is anything that applies a coating 47, 47' to selected areas of the optical fiber panel 46 and does not become part of the final assembly. The roll pressure and roller surface type can be controlled to control the size, shape and location of the coated areas 47, 47' on the optical fiber bends 15. Also, if desired, a coating with a high vapor pressure or a heat or radiation durable coating may be used as the coating material to decrease panel assembly time due to the fast cure rate of the coating material.

Regardless of which method is used to apply the coating to selected normal light emitting areas of the optical fiber panels, impurities may be added to the coating to cause increased attenuation or diffusion of light. Also, the added impurities may be used to absorb or reflect predetermined frequencies of radiation. Moreover, the coating may if desired be used to completely or partially dissolve the outer sheath or cladding that surrounds the light transmitting core portion of each optical fiber.

Such light emitting panel assemblies may be used for different applications, including back lighting, photo therapy treatment, and light curing of adhesives and the like. Typical back lighting applications would be back lighting liquid crystal displays or transparencies and the like. Such woven optical fiber panels in accordance with this invention can be laminated directly to or inserted behind a liquid crystal display. For smaller liquid crystal displays, a light emitting diode may be epoxied to a cable end of the panel assembly to provide adequate back light and as much as 100,000 hours life. For larger panels, incandescent bulbs, arc lamps, the sun, or other light sources may be used.

Figure 11:
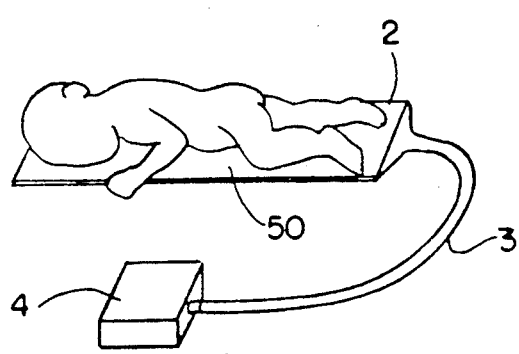
Figure 12:
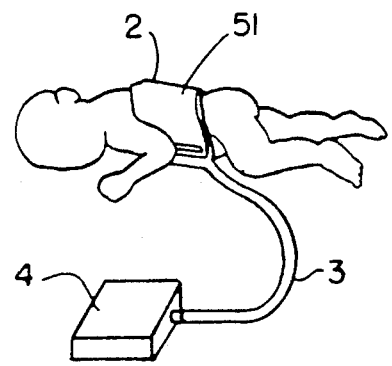

To facilitate use of such light emitting panel assemblies for phototherapy, the panels may be formed in the shape of a pad, belt, collar, blanket, strap, or other such shape. FIG. 11 schematically shows a panel 2 in the shape of a pad 50, whereas FIG. 12 schematically shows a panel 2 in the shape of a belt 51. In either case, the panel 2 may be placed in direct contact or near a patient such as a newborn baby to provide photo therapy treatment for jaundice or the like. Presently, such treatment is administered using banks of fluorescent lights or single incandescent reflector lamps. Jaundice is dissipated by light in approximately the 450-500 nanometer range. Placing the light emitting panel 2 in direct contact with the patient as shown in FIGS. 11 and 12 causes a greater percentage of light, at a higher intensity, to be transmitted to the patient. Undesired wavelengths of light may be filtered out at the light source to produce a cold light emitting panel free of harmful infrared or ultraviolet radiation. Also, electrical energy is removed from the treatment area because of the fiber optic light cable 3 which permits use of a remote light source 4 such as an incandescent lamp, arc lamp, or the like. If a tungsten halogen lamp is used, the halogens may be adjusted such that the lamp emits a greater percentage of radiation in the treatment frequency range.

Another example of how the light emitting panels of the present invention may be used is in the radiation curing or light curing of adhesives or epoxies and the like. Light cured adhesives are used in a variety of applications, including aerospace, dental, photography, circuit board, and electronic component manufacture. With the proper light source, the woven fiber optic panels of the present invention will produce high intensity uniform light to any desired area. Higher intensity light produces faster curing times to greater depths. Also, uniform light output produces even curing over an entire surface or object and reduces internal stress. The light emitting panels may be fabricated such that they are flexible and can conform to the surface or part being cured, and can be fabricated such that they are an internal part of an assembly that is self curing or can be used in curing. The remote light source also allows the use of the light emitting panels of the present invention in dangerous or inaccessible locations, or where electricity, heat, EMI or RFI are problems.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A connector assembly comprising a plurality of optical fibers, buffer means surrounding end portions of said optical fibers, and ferrule means crimped onto said buffer means to squeeze said buffer means around said end portions to pack said end portions substantially solid, said optical fibers being made of plastic, and said end portions being deformed during crimping to a desired cross-sectional shape to pack said end portions more solid.

2. The connector assembly of claim 1 wherein said buffer means is made of a material that protects said end portions during crimping of said ferrule means.

3. The connector assembly of claim 1 wherein said buffer means is made of a material having a low refractive index.

4. The connector assembly of claim 1 wherein said buffer means is made of Teflon.

5. The connector assembly of claim 1 wherein said optical fibers are made of plastic and said end portions are heat treated before crimping to preshrink said end portions to produce a higher operating temperature limit.

6. The connector assembly of claim 1 wherein the cross-sectional area of individual end portions is in the shape of a polygon.

7. The connector assembly of claim 1 which is heated during crimping.

8. The connector assembly of claim 1 wherein said end portions are polished to a desired finish, and coating means is applied to said polished end portions for reflecting certain wavelengths of light.

9. The connector assembly of claim 1 further comprising filter means affixed to said end portions for filtering out certain wavelengths of light.

10. A connector assembly comprising a plurality of optical fibers, buffer means surrounding end portions of said optical fibers, ferrule means crimped onto said buffer means to squeeze said buffer means around said end portions to pack said end portions substantially solid, said connector assembly having a polished end, and shielding means for preventing light from a light source from striking selected areas of said polished end to reduce heat build-up in said connector assembly so that more light energy can be transmitted through said optical fibers without overheating.

11. The connector assembly of claim 10 wherein said shielding means prevents such light from striking the outer end of said buffer means while permitting such light to strike the ends of said optical fibers.

12. The connector assembly of claim 10 wherein said shielding means comprises a reflective coating applied to the outer end of said buffer means for reflecting such light away from said buffer means.

13. The connector assembly of claim 10 wherein said shielding means comprises a plate overlying the outer end of said buffer means, said plate having an opening permitting such light to pass through said plate onto the ends of said optical fibers.

14. The connector assembly of claim 13 wherein said plate is located in front of said polished end in spaced relation therefrom to allow air flow between said plate and polished end.

15. The connector assembly of claim 14 wherein said plate is attached to said connector assembly.

16. The connector assembly of claim 14 wherein said plate is supported independently of said connector assembly.

17. The connector assembly of claim 16 wherein said plate is made of a material that absorbs the light that would otherwise strike the outer end of said buffer means.

18. The connector assembly of claim 10 wherein said shielding means comprises a cap that fits over said polished end of said connector assembly, said cap having an outer end wall that prevents such light from striking the outer end of said buffer means, and an opening in said outer end wall that permits such light to strike the ends of said optical fibers.

19. The connector assembly of claim 18 wherein said outer end wall of said cap has a reflective surface that reflects such light away from the outer end of said buffer means.

20. The connector assembly of claim 18 wherein said outer end wall of said cap is spaced forwardly of said polished end of said connector assembly, and slots are provided in the sides of said cap to permit air flow between said outer end wall and said polished end of said connector assembly.

* * * * *